United States Patent [19]

Röhl

[11] 4,455,463

[45] Jun. 19, 1984

[54] SWITCH ARRANGEMENT FOR MOTORCYCLES

[75] Inventor: Ekkehard Röhl, Bergisch Gladbach, Fed. Rep. of Germany

[73] Assignee: Bayerische Motoren Werke Aktiengesellschaft, Munich, Fed. Rep. of Germany

[21] Appl. No.: 408,947

[22] Filed: Aug. 17, 1982

[30] Foreign Application Priority Data

Aug. 17, 1981 [DE] Fed. Rep. of Germany ....... 3132311

[51] Int. Cl.³ .............................................. H01H 9/06
[52] U.S. Cl. .................. 200/61.85; 74/551.8;
200/157; 340/134
[58] Field of Search ................... 200/61.85, 157, 52 R,
200/61.54; 340/134; 180/219, 333; 74/551.8,
551.9

[56] References Cited

U.S. PATENT DOCUMENTS

| | | | |
|---|---|---|---|
| 1,674,966 | 6/1928 | Fisher | 200/61.54 |
| 3,834,249 | 9/1974 | Bothwell | 74/551.8 |
| 4,034,761 | 7/1977 | Prater et al. | 200/157 |
| 4,180,713 | 12/1979 | Gonzales | 200/52 R |

FOREIGN PATENT DOCUMENTS 54-2844797 4/1979 Japan ................................. 180/219

*Primary Examiner*—George H. Miller, Jr.
*Assistant Examiner*—Morris Ginsburg
*Attorney, Agent, or Firm*—Craig & Burns

[57] ABSTRACT

A switch arrangement for motorcycles includes a first rocker type switch which is located on a handlebar near a handlebar grip and has an actuating rocker which is adjustable in several working positions in a plane which is normal to the handlebar, as well as two single action switches, each of which has a single working position and also has a rocker type switch part. To significantly improve ergonomy, the single-action switches are arranged at least approximately in an adjustment plane of the first rocker type switch the are also adjustable in this plane. In accordance with a preferred embodiment, the three switches are located within a 90° sector.

11 Claims, 2 Drawing Figures

SWITCH ARRANGEMENT FOR MOTORCYCLES

BACKGROUND AND SUMMARY OF THE INVENTION

The present invention relates to a switch arrangement for motorcycles, including a (first) rocker-type switch that is located at the handlebar in proximity of a handlebar grip and has an actuating rocker adjustable into several working positions within a plane perpendicular to the handlebar, and two single-action switches, each of which has a switch part and a working position.

In a known switch arrangement of this type (Harley-Davidson motorcycle), the two single-action switches are located in a line parallel to the centerline of the handlebar. To actuate the single-action switch away from the handlebar grip, it is necessary to reach over the other single-action switch. The danger thereby exists that the latter switch may also be actuated inadvertently. Furthermore the entire switch arrangement is unfavorable from an ergonomic point of view since the distance of the two single-action switches constructed as pushbutton switches and of the rocker-type switch from the handlebar grip is different.

The present invention is concerned with the task to provide a switch arrangement of the aforementioned type in which the actuation of the rocker-type switch and of the two single-action switches can be realized in an ergonomically favorable manner and without the danger of incorrect actuation.

The underlying problems are solved according to the present invention in that the single-action switches are located at least approximately in the adjustment plane of the (first) rocker-type switch and are adjustable also within this plane.

The rocker-type switch and the two single-action switches are at the same distance from the handlebar grip and can be actuated by mere pivoting of the thumb. During actuation of one of the switches an inadvertent actuation of another switch is precluded since the switches are located at different circumferential angles of the handlebar grip respectively of the handlebar.

The position of the switches is particularly favorable from an ergonomic point of view if the single-action switches together with the rocker-type switch are located relative to the handlebar within a sector having an angle of approximately 90° and at the same distances from one another. The thumb can sweep over this angle, starting from a center position without having to remove for that purpose the hand from the handlebar grip.

A further increase of the safety against an incorrect actuation of a switch can be achieved in that the single-action switches are disposed adjacent to one another. In contrast to a switch arrangement in which the rocker-type switch is located between the two single-action switches, it is not necessary to sweep or reach over the rocker-type switch when changing from one single-action switch to the other since the rocker-type switch is located outside of the pivot area of the thumb necessary therefor.

The actuation safety can be further increased in that the single-action switches are further rocker-type switches. In that case no "change in mental approach" between different types of actuation is then necessary so that the switches can be actuated safely and rapidly.

To increase the ergonomy of the switch arrangement, the contact surfaces of the actuating rockers of the further rocker-type switches are so constructed that they form an angle of about 90°. In this case, the two single-action switches can be detected by touch or feel and safely actuated also under unfavorable movements.

The feel-detection safety of such types of single-action switches can be further increased in that their contact surfaces are respectively parallel to one of the contact surfaces of the (multiple) rocker-type switch. The two single-action switches then together form also approximately a (multiple) rocker-type switch which can be actuated in the same manner as the multiple rocker-type switch, properly speaking, and differs therefrom only as regards its position along the circumference of the handlebar.

In the known switch arrangement, one of the single-action switches serves for the engagement of the turn indicator lights to indicate a driving direction. The turn indicator lights are engaged for such length of time as the single action switch constructed as pushbutton switch is kept in its operating position. As soon as the pushbutton switch is released, the turn indicator lights are also turned off. The special type of the switch actuation entails the drawback that during the operation of these turn indicator lights neither the rocker-type switch nor the other single-action switch can be actuated. The consequence thereof is a considerable impairment of the traffic safety by interruption of the operation of the turn indicator lights during actuation of another switch respectively by non-actuation of another switch during operation of the turn indicator lights. Furthermore, this type of actuation of the single-action switch is ergonomically unfavorable since it may lead to fatigue manifestations. All of these disadvantages can be eliminated in a simple manner in accordance with the present invention in that one of the two further switches is a rocker-type pushbutton switch for the engagement of the turn indicator lights, respectively, for the turning off of the turn indicator lights for a given driving direction upon subsequent actuation of the rocker-type pushbutton type switch. In other words, the engagement and disengagement of the turn indicator lights take place by briefly actuating the rocker-type pushbutton switch twice. The two other rocker-type switches can then be actuated in the remaining period of time independently of the operation of the turn indicator lights, i.e. can be operated between the engagement and disengagement of the turn indicator lights by repeated actuation of the corresponding rocker-type pushbutton switch.

If, as also known from the aforementioned motorcycle, a switch is also provided at the other handlebar grip for the engagement of the turn indicator lights of the other driving direction, then with the engagement of the turn indicator lights with the aid of a rocker-type pushbutton switch, the turn indicator lights for the driving direction which may have been previously turned on up to that point, will be automatically turned off.

These and further objects, features and advantages of the present invention will become more apparent from the following description when taken in connection with the accompanying drawings which show, for purposes of illustration only, a single embodiment in accordance with the present invention.

DETAILED DESCRIPTION OF THE PREFERRED EMBODIMENT

Figure 1:
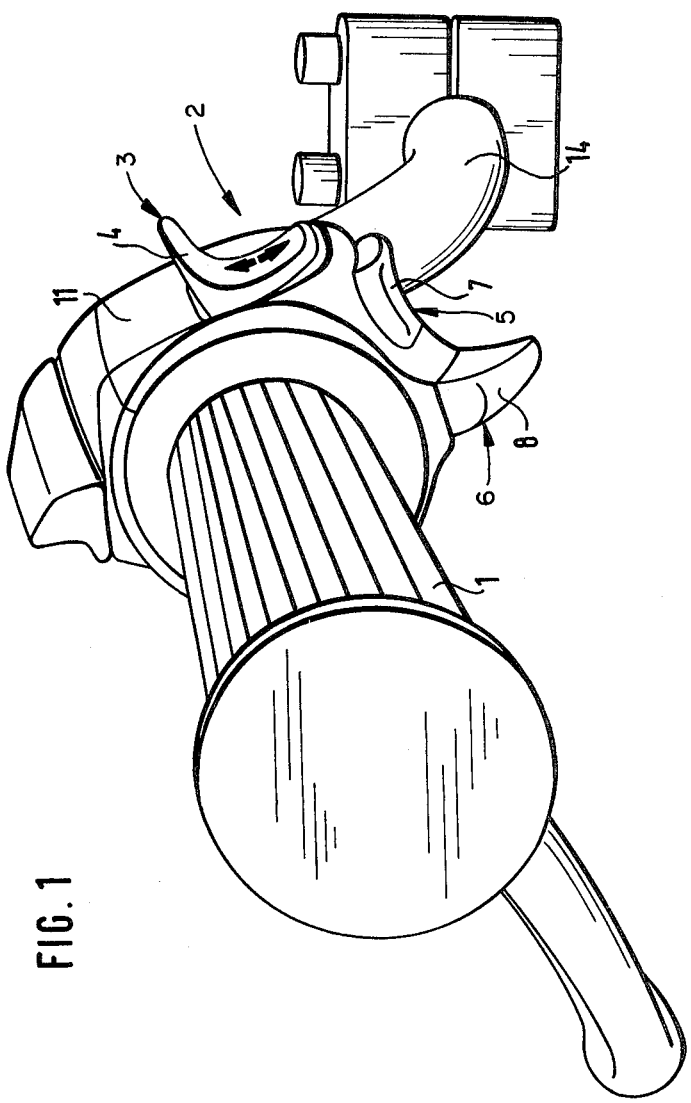
FIG. 1 is a switch arrangement for a motorcycle with one multiple rocker type switch and two single-action rocker-type switches in a perspective view.

Referring now to the drawing wherein like reference numerals are used throughout the two views to designate like parts, a switch arrangement 2 secured in proximity of the left handlebar grip 1 of a motorcycle includes a multiple rocker-type switch 3 with an actuating rocker 4 as well as two single-action rocker-type switches 5 and 6 with actuating rockers 7 and 8. The actuating rocker 4 includes two actuating or contact surfaces 9 and 10 extending approximately at right angle to one another; the actuating or contact surfaces 9 and 10 project approximately radially out of the housing 11 of the switch arrangement 2. The contact or actuating surface of the actuating rocker 7 extends parallel to the actuating or contact surface 9 whereas the actuating or contact surface of the actuating rocker 8 is disposed parallel to the actuating or contact surface 10. The actuating or contact surfaces of the rocker-type switches 5 and 6 therefore also form an angle of about 90°. The actuating or contact surface of the rocker-type switch 5 thereby extends approximately in the circumferential direction of the handlebar grip 1 whereas the actuating or contact surface of the rocker-type switch 6 projects radially.

Figure 2:
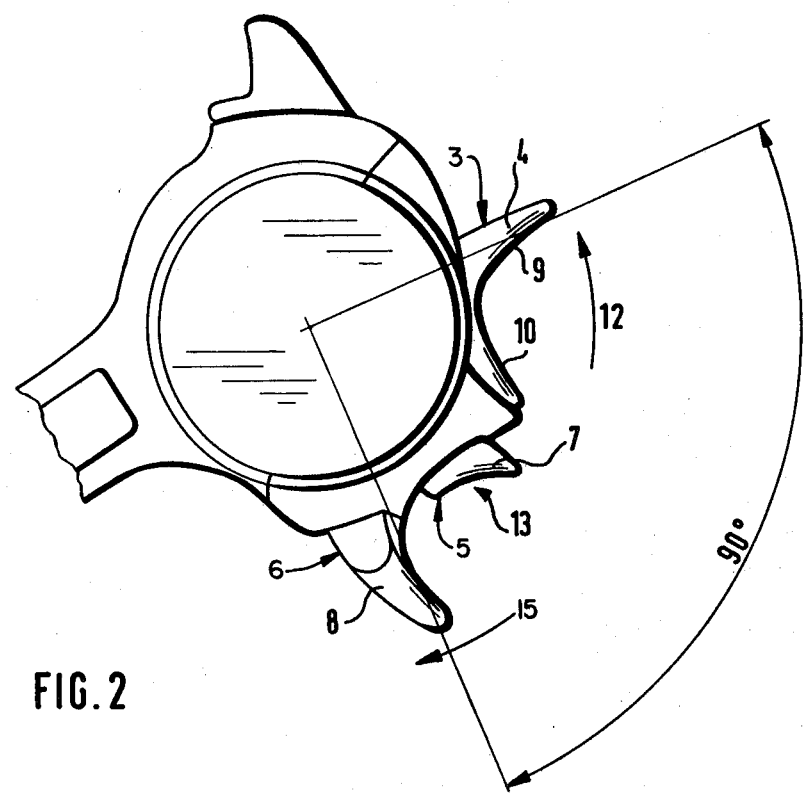
FIG. 2 is the switch arrangement of FIG. 1 in a side view.

For example, the type of lighting can be selected with the aid of the rocker-type switch 3. Starting from the illustrated operating position in which, for example, the low beams are engaged or turned-on, the other operating position may be realized by adjustment of the actuating rocker 4 in the direction of the arrow 12 (FIG. 2). The switch actuating rocker 4 is thereby displaced in a plane perpendicular to the handlebar grip. For example, the high beams are engaged or turned on in this other operating position. By readjustment of the switch actuating rocker 4 opposite the direction of the arrow 12 beyond the illustrated operating position, a third operating position may be additionally selected, in which the light signal is turned-on. The rocker-type switch 3 acts as pushbutton switch for this operating position, that is, this operating position is unstable whereas the two first mentioned operating positions are stable.

The rocker-type switch 5 located in the described adjusting plane of the rocker-type switch 3 serves, for example, to engage the turn indicator lights of the left driving direction. For that purpose, the rocker-type switch 5 is constructed as rocker-type pushbutton switch. If the turn indicator lights are turned off, they are turned on by brief actuation of the switch actuating rocker 7 in the direction of arrow 13 (FIG. 2) and remain turned-on for such length of time until the switch actuating rocker 7 is actuated again in the same manner. If, during engagement of these turn indicator lights, the turn indicator lights of the other driving direction are turned on, then the previously engaged turn indicator lights are automatically turned off at the same time.

The rocker-type switch 6 is constructed for example, also as rocker-type pushbutton switch and serves for the engagement of the horn. The horn is thereby turned on for such length of time until the actuating rocker 8 is released and returns into its normal position under the action of a spring (not shown).

As can be seen in particular from FIG. 2, the rocker-type switches 3, 5 and 6 lie within a sector that subtends relative to the handlebar grip 1 and handlebar 14 an angle of about 90°. It becomes possible thereby to reach and to actuate all of these rocker-type switches merely by pivoting the thumb. The favorable ergonomy of the switch actuation is enhanced by the special actuation of the individual rocker-type switches. Whereas for the actuation of the rocker-type switches 4 and 6 a movement of the thumb in the circumferential direction of the handlebar grip 1 is necessary, the rocker-type switch 5 is displaced by movement of the thumb in the radial direction of the handlebar 14. Starting from the two extreme positions of the thumb during actuation of the rocker-type switch 4 respectively of the rocker-type switch 6, the other extreme position is reached without the danger of an erroneous actuation of a switch. The rocker-type switch 5 which is located within this transition area projects only slightly out of the surface of the switch housing 2 by reason of the location and arrangement of its actuating surface 7. At the same time, the rocker-type switches 5 and 6 form a multiple rocker-type switch with two operating positions that can be actuated nearly in the same manner as the rocker-type switch 4. This essentially uniform actuation of the switch arrangement with a position of the individual rocker-type switches which at the same time is clearly distinct from one another, serves to increase the switching safety and speed. Furthermore, the space requirement of the switching arrangement can be kept relatively small, especially by the selection and arrangement of the rocker-type switches 5 and 6 in the manner illustrated in the drawing.

While I have shown and described a single embodiment in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. A switch arrangement of motorcycles, comprising a rocker-type switch which is located on a handlebar near a handlebar grip and includes an actuating rocker, said actuating rocker being adjustable into several operating positions within an adjustment plane substantially normal to the handlebar, and two single-action switches, each of said single-action switches having a switching member and one operating position, and said single-action switches being located at least approximately in the adjustment plane of said rocker-type switch and being adjustable also substantially in said adjustment plane.

2. A switch arrangement in accordance with claim 1, wherein the single working position switches as well as the rocker-type switch are located relative to the handlebar within a sector of approximately 90°, the single-action switches and the rocker-type switch being located one behind the other in a circumferential direction, the distance between any two directly adjacent switches being substantially equal.

3. A switch arrangement in accordance with claim 1 or 2, wherein the single-action switches are disposed adjacent to one another.

4. A switch arrangement in accordance with claim 1 or 2, wherein the single-action switches are also rocker-type switches.

5. A switch arrangement in accordance with claim 3, wherein the single-action switches are also rocker-type switches.

6. A switch arrangement in accordance with claim 5, wherein the single-action switches constructed as rocker-type switches have actuating rockers whose actuating surfaces subtend an angle of approximately 90°.

7. A switch arrangement in accordance with claim 6, wherein said first-mentioned rocker-type switch includes an actuating rocker having two actuating surfaces, and wherein the actuating surfaces of said two single-action switches are substantially parallel to a respective actuating surface of the first-mentioned rocker-type switch.

8. A switch arrangement in accordance with claim 7, wherein one of said single-action switches is a pushbutton rocker-type switch operable to turn on turn indicator lights when pressed once and to turn off said turn indicator lights when pressed a second time.

9. A switch arrangement in accordance with claim 6, wherein one of said single-action switches is a pushbutton rocker-type switch operable to turn on turn indicator lights when pressed once and to turn off said turn indicator lights when pressed a second time.

10. A switch arrangement in accordance with claim 5, wherein one of said single-action switches is a pushbutton rocker-type switch operable to turn on turn indicator lights when pressed once and to turn off said turn indicator lights when pressed a second time.

11. A switch arrangement in accordance with claim 1 or 2, the one of the single-action switches which is positioned between the other single-action switch and the first-mentioned rocker-type switch is operable substantially in a radial direction with respect to said handlebar and the other single-action switch and the first-mentioned rocker-type switch are operable substantially circumferentially relative to the handlebar.

* * * * *